UNITED STATES PATENT OFFICE.

GEORGES IMBERT, OF NUREMBERG, GERMANY.

PROCESS OF PRODUCING DICHLOR-ETHOXY-ETHYLENE.

No. 894,148.  Specification of Letters Patent.  Patented July 21, 1908.

Application filed May 1, 1907. Serial No. 371,238.

*To all whom it may concern:*

Be it known that I, GEORGES IMBERT, a subject of the German Empire, residing at 54 Gugelstrasse, Nuremberg, Bavaria, Germany, have invented a new and useful Process for Producing Dichlor-Ethoxy-Ethylene, of which the following is a description.

The production of di-chlor-ethoxy-ethylene is described in the British Patent No. 678 of 1906. According to this patent, trichlor-ethylene or acetylene tetrachlorid is subjected to the action of potassium or sodium ethylate. The reaction may be explained by the following equation:—

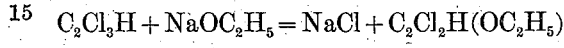

$$C_2Cl_3H + NaOC_2H_5 = NaCl + C_2Cl_2H(OC_2H_5)$$

The technical application of this process involves the employment of absolute alcohol and alkaline metals, which are very expensive substances.

My experiments have shown that the ethylate employed in the process covered by the said patent may be replaced by a reagent obtained by boiling a solution or a suspension of caustic alkali in alcohol—which need not be absolute—with suitable means for absorbing or removing water, such as quick lime, calcium carbid, protoxid of barium or similar substances.

Example:—40 kilos of caustic soda, 100 kilos of quick lime and 131,5 kilos of alcohol of about 94% are boiled for about 12 hours. The mixture is then allowed to cool slightly and 131.5 kilos of trichlor-ethylene are allowed to flow in, whereupon the temperature is raised to boiling point.

The product of the reaction is obtained by distillation or is taken off by steam. The output attained is very favorable.

I claim as my invention:—

A process for producing di-chlor-ethoxy-ethylene from trichlor-ethylene, which consists in allowing the latter to act upon a reagent obtained by boiling an alcoholic solution of caustic alkali with suitable water absorbing substances.

In testimony whereof I affix my signature in the presence of two witnesses.

GEORGES IMBERT.

Witnesses:
  EUGEN GALITZENSTEIN,
  JOHANN TANMUNSTHOD.